United States Patent [19]

Stees

[11] 4,258,897
[45] Mar. 31, 1981

[54] STRUCTURE FOR FORMING CONCRETE TROUGHS IN THE GROUND

[76] Inventor: Gene R. Stees, Rte. 3, Geneseo, Ill. 61254

[21] Appl. No.: 85,144

[22] Filed: Oct. 15, 1979

[51] Int. Cl.³ .......................... E04H 7/18; B28B 7/04; B28B 7/30
[52] U.S. Cl. ...................... 249/11; 249/159; 249/170; 249/177; 249/178; 249/181; 249/182; 249/185; 249/188
[58] Field of Search .................. 249/11, 12, 148, 149, 249/155, 159, 170, 185, 177, 178, 180, 181, 182, 188, 207

[56] References Cited

U.S. PATENT DOCUMENTS

| | | | |
|---|---|---|---|
| 330,013 | 11/1885 | Gillham | 249/11 X |
| 405,652 | 6/1889 | Boade | 249/11 |
| 735,385 | 8/1903 | Huttinger | 249/180 X |
| 833,595 | 10/1906 | Gannett et al. | 249/177 X |
| 865,968 | 9/1907 | Hickson | 425/159 |
| 871,385 | 11/1907 | Blair | 249/11 X |
| 955,156 | 4/1910 | Hickson | 249/11 X |
| 984,216 | 2/1911 | Henderson | 249/182 |
| 1,008,264 | 11/1911 | Hill | 249/177 |
| 1,143,862 | 6/1915 | Romano | 249/11 |
| 1,304,945 | 5/1919 | Davidson | 425/59 |
| 1,337,074 | 4/1920 | Jester | 249/149 |
| 1,722,038 | 7/1929 | Dougherty | 249/177 X |
| 2,182,808 | 12/1939 | Holz | 249/149 X |
| 2,590,683 | 3/1952 | Clapp | 425/59 |
| 2,708,782 | 5/1955 | Jessen | 425/59 |
| 2,786,255 | 3/1957 | Heeb | 249/11 |
| 2,870,518 | 1/1959 | Bössner | 525/63 |
| 2,917,804 | 12/1959 | Barrow | 249/177 X |

*Primary Examiner*—J. Howard Flint, Jr.
*Attorney, Agent, or Firm*—Henderson & Sturm

[57] ABSTRACT

A method and structure in which a Y- or V-shaped trench is dug in the ground for spatially receiving a smaller, complentarily shaped form that is supported in the trench by re-enforcing rods or the like that remain in the set-up concrete when the form is removed. The form has retractible side walls to facilitate removal from the finished trough and further includes removable gutter and drain means that are left as integral parts of the trough when the form is removed.

11 Claims, 12 Drawing Figures

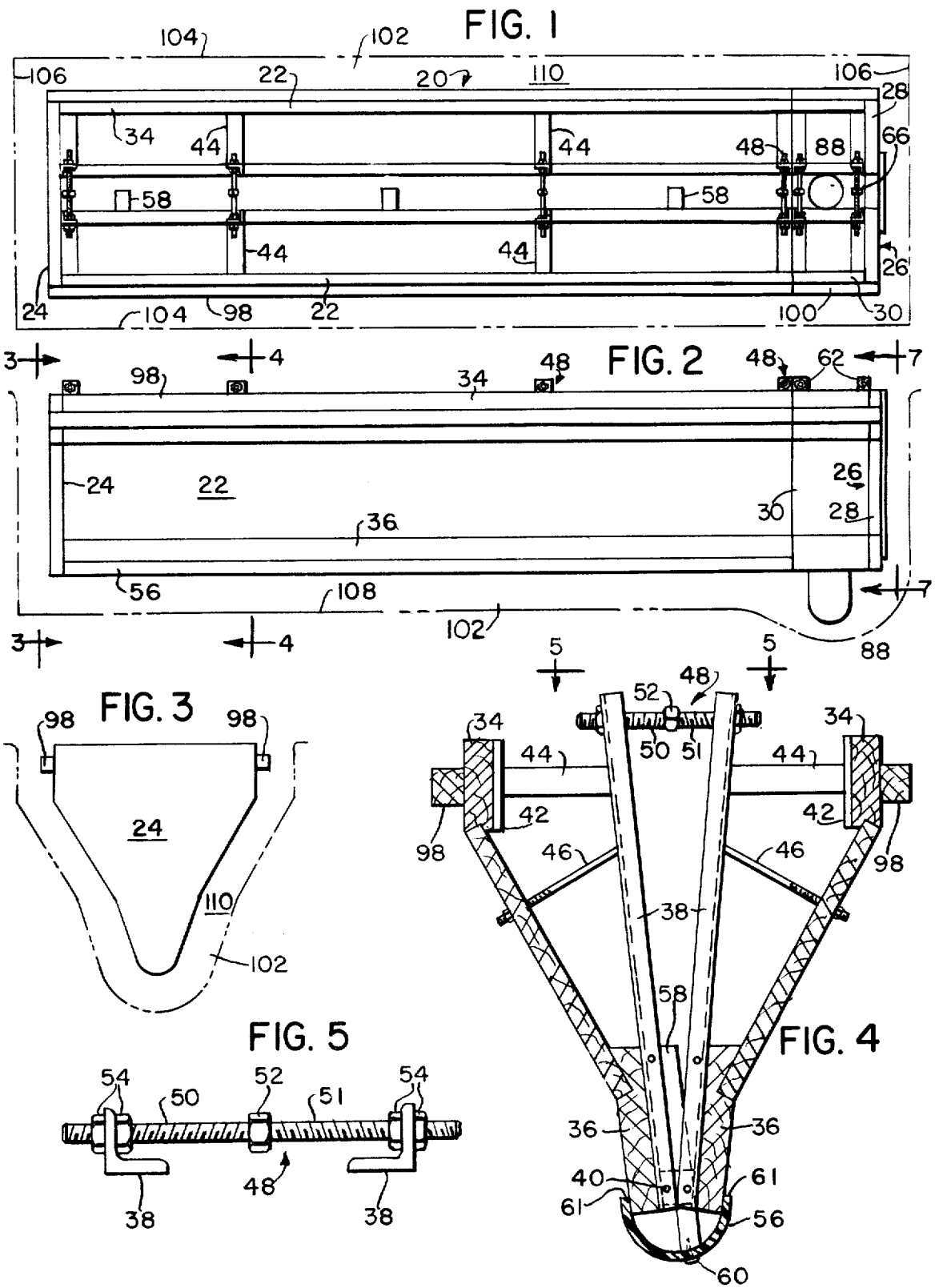

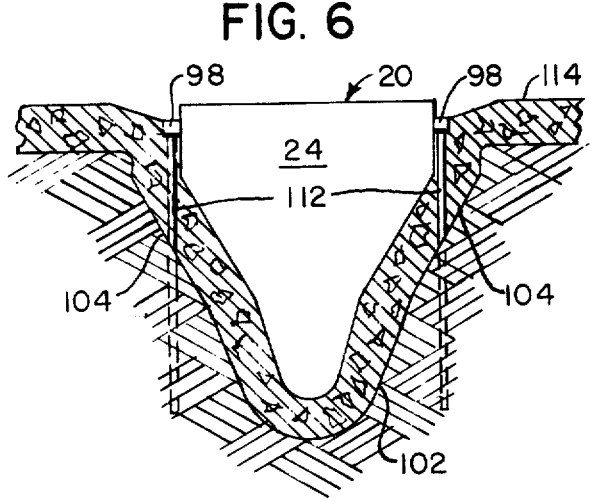
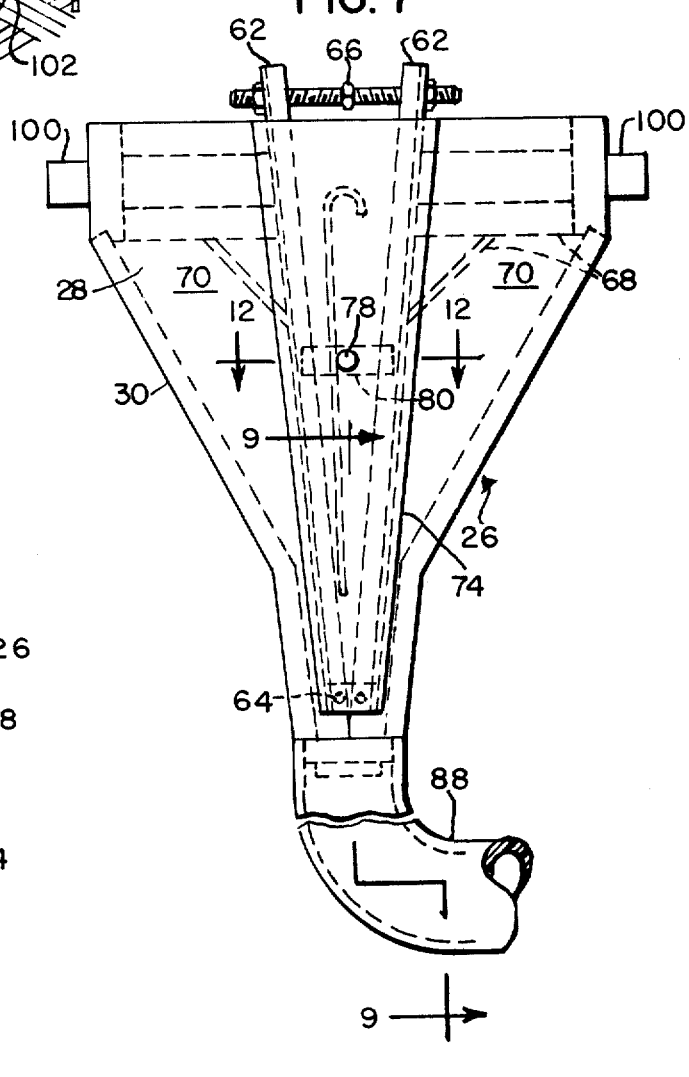
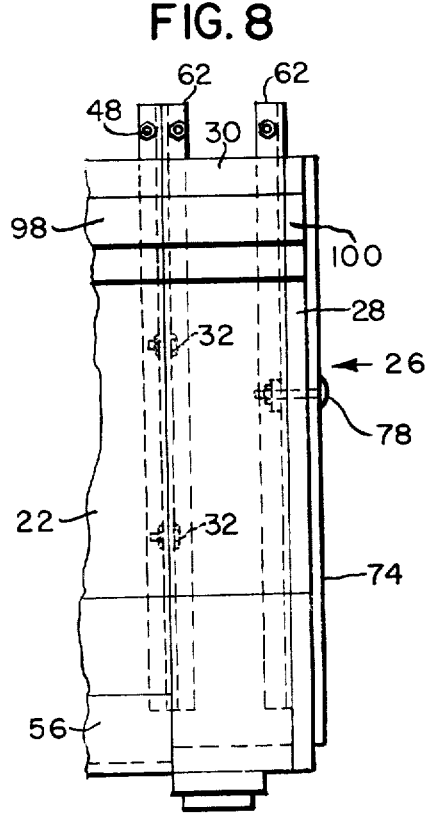

STRUCTURE FOR FORMING CONCRETE TROUGHS IN THE GROUND

SUMMARY OF THE INVENTION

It is well known to raise domestic animals, such as cattle, hogs, etc. in lots having concrete floors and troughs to carry away animal waste. It is an object of this invention to provide significant improvements in the formation of the troughs so that the troughs and floor can be poured at the same time. This is accomplished by a novel type of form, especially one of Y shape as seen in transverse section. The form has side boards or walls hinged at their bottom edges to provide a variable-angle Y so that the side boards can be retracted in order to facilitate removal of the form from the finished trough. The form further features an open bottom closed by removable gutter means which is attached prior to placing the form in the pre-dug trench but which is left in the trough to form the bottom thereof after the form is removed. The gutter means cooperates with a portion of the form that enables the formation in the trough of a drain outlet in communication with the trough for draining animal wastes from the trough. The form is so constructed that several may be joined in end-to-end relation for the formation of elongated troughs, thus minimizing the size and weight to be handled. The trough, when finished, includes not only the gutter means and drain but also reenforcing rods by means of which the form is initially supported in the trench; i.e., prior to pouring of the concrete. Further objects and features will appear as a preferred embodiment of the invention is set forth in the ensuing description and accompanying sheets of drawings.

DESCRIPTION OF THE DRAWINGS

FIG. 1 is a plan of the form, the outline of the trench being shown in broken lines.

FIG. 2 is a side elevation of the same.

FIG. 3 is an end elevation as seen along the line 3—3 of FIG. 1.

FIG. 4 is an enlarged section as seen along the line 4—4 of FIG. 1.

FIG. 5 is a plan as seen along the line 5—5 of FIG. 4.

FIG. 6 is a representative cross section showing the trench, concrete trough and form before removal of the form.

FIG. 7 is an enlarged end view as seen along the line 7—7 of FIG. 2.

FIG. 8 is a partial side elevation of the structure shown in FIG. 7.

DETAILED DESCRIPTION OF THE INVENTION

Figure 9:
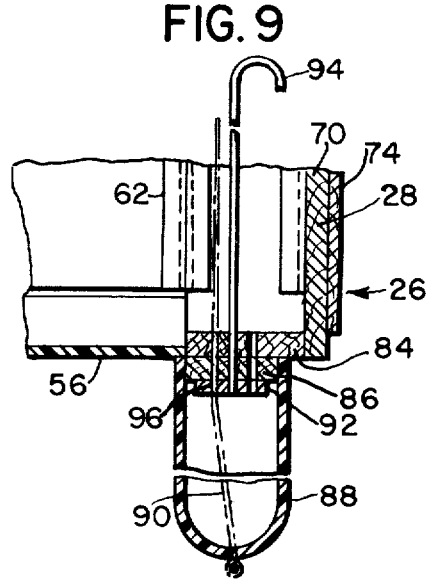
FIG. 9 is a section, with portions broken away, as seen on the line 9—9 of FIG. 7.

The basic form, designated in its entirety at 20, is made up of a pair of elongated side boards 22, a left-hand end wall member 24 and right-hand end wall means 26. The end wall means includes an end wall 28 and a pair of side walls 30 that form extensions of the respective side boards 22 when the means 26 is attached to the basic form as by being bolted thereto at 32 (FIG. 8).

The form, considered for the moment without the end wall means 26, has its side boards perferably constructed of ¾" plywood, firmly fastened along upper edges to wooden stringers 34 and at lower edges to lower stringers 36 (FIG. 4). A plurality of generally upright angle members 38 are connected together at their lower ends by hinge means 40 and are fastened to the stringers 36 in any suitable fashion. The inner side of each upper stringer has rigidly secured thereto a steel plate 42 and from these steel braces 44 extend inwardly to the upper portions of the angle members 38, at which points welding is resorted to as the preferred method of joining the parts. Additional braces may be used at 46. It will be seen that there are several angles, braces etc. and thus are several hinge means, all coaxially related lengthwise of the form. The hinge means gives the form the characteristic of a variable-angle Y and thus the angle between the side boards 22 may be varied. The means for accomplishing this comprises a plurality of selecting means 48. Since these are or may be alike, only one will be described in detail. See FIGS. 4 and 5.

Each means 48 comprises a threaded rod 50 to the central part of which is rigidly secured, as by welding, a noncircular member such as a typical nut 52. The rod passes through appropriate openings in the upper ends of the angle members 38, and, at each side of each angle member, the rod receives additional nuts 54. By this means, the side boards may be readily adusted for parallelism before use in the trench and may be easily retracted to facilitate removal of the form from the trench after the poured concrete has set up sufficiently. The bottom edges of the side boards 22 do not meet at their lower hinged ends and for this reason the form is adapted to receive a bottom closure in the form of gutter means or a channel. Mounting blocks 58 are attached firmly to the inner side of the lower stringer 36 and to these the channel 56 is nailed as at 60 (FIG. 4). Since the channel overlaps the stringers outwardly, they provide shoulders 61 which, when the space between the form and trench is filled with concrete, are engaged by the concrete, resulting in holding the channel in place when the form is lifted for withdrawal, which is facilitated because the nails 60 are driven in vertically or substantially so. After the form is removed, the nails may be clipped off so as to eliminate obstruction to the flow of waste.

Figure 10:
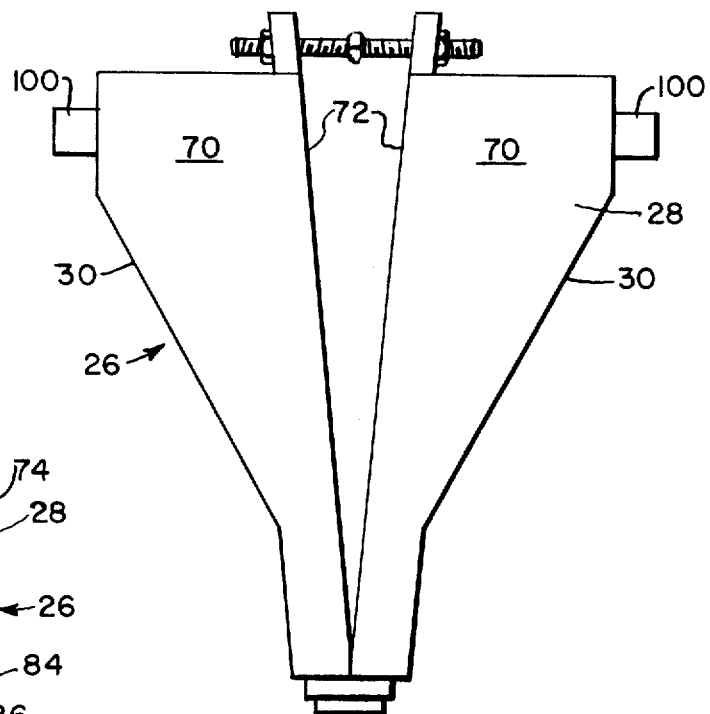
FIG. 10 is a reduced-scale view of the right-hand end wall with its cover plate removed.
Figure 11:
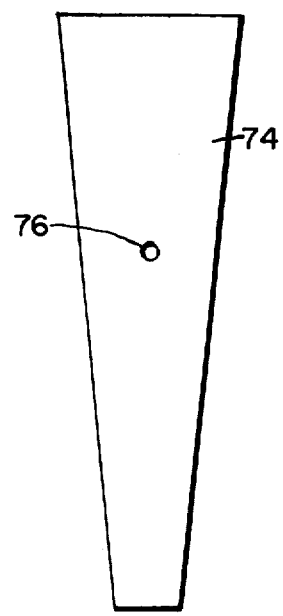
FIG. 11 is an elevation of the cover plate for the structure of FIG. 10.
Figure 12:
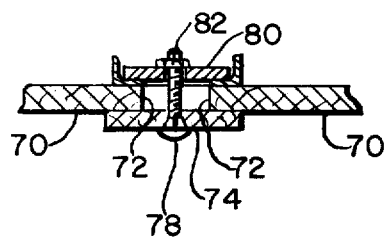
FIG. 12 is a section on the line 12—12 of FIG. 7.

The end wall means is constructed in a fashion different from that of the end wall 24 because it contains provision for a drain outlet from the channel 56. Whereas the end wall 24 is of simple one-piece construction and has a lower portion closing the end of the channel (FIG. 3), the end wall means 26 is a multi-part, box-like structure, incuding the end wall 28 and side board extensions 30, plus generally upright angle members 62 similar to those described at 38, being hinged together at their lower ends at 64 and cross-connected by selecting means 66 similar to those at 48. As previously described (See FIG. 8), the end wall means is attached to the basic form as by bolts 32 and thus becomes essentially a part of the form but is made separately for reasons to appear presently. In addition to the parts just described, the means 26 includes suitable braces 68. As best seen in FIG. 10, the end wall 28 is made up of a pair of coplanar sections 70 having confronting edges 72 which do not meet when the form is expanded. In order to prevent the entry of concrete during the pouring step, plate 74 (FIG. 11) is provided to close this opening. The plate has one or more holes 76 for receiving securing means. An exemplary means is shown here as a bolt 78 passed through the hole 76, through the opening between the confronting edges and through a perforated spanner plate 80, receiving a nut 82 (FIG 12).

As seen in FIG. 9, the bottom of the end wall means 26 is closed by a pair of wooden blocks 84 and 86, the latter being circular on an upright axis. The diameter of the block 86 conforms to the inside diameter of a drain outlet in the form of an elbow 88. This elbow, like the channel 56, may be of any suitable material, that employed here being the well-known PVC (polyvinylchloride) conventionally used for drain tile and the like. Before the form is installed, the elbow is fitted onto the circular block and a hole drilled in the bottom of the elbow to receive a temporary fastening means, here shown as a wire 90 knotted beneath the elbow and extended upwardly to be twisted about any of the structural, interior parts of the means 26. In addition to the blocks 84 and 86, the bottom of the means 26 has affixed thereto a steel plate 92 to which is attached the lower end of a lifting hook 94. The plate 92 has therein a pair of holes, as at 96 through one of which the attaching wire 90 may be passed. When the form is ready for removal from the trough, the wire 90 is clipped and the sides of the form are retracted after the bolt 78 is loosened. The end wall means 26 is preferably detached from the basic form by removal of the bolts 32 or, depending upon the size and weight of the form, the entire unit may be raised at once.

The use of the form and the novel method will now be described. As a preliminary to this, it should be noted that the side boards 22 of the form are equipped with longitudinal strips or supports 98 and the end wall means 26 is likewise equipped with support extensions 100. Each strip 98-100 is secured to its side board and side board extension in such fashion as to slope downwardly from left to right as seen in FIG. 2. This assures that the finished trough has the desired fall, preferably about one inch in twenty feet.

After selection of a suitable site, a trench 102 is dug in the ground, delineated by sides 104, ends 106 and a bottom 108, the bottom being a little deeper to accommodate the drain elbow (FIG. 2). The trench is dimensionally larger than the form so as to leave a surrounding space 110 all around and at the bottom of the form when the form is installed. Before installation of the form, suitable form supports are arranged, these here being in the form of a plurality of support rods 112 (FIG. 6). These may be lengths of typical reenforcing rod and are driven into the ground to such extent that their upper ends are just about at or below the level of the floor, seen at 114 in FIG. 6. The rods are spaced laterally apart as respect the length of the form and in such fashion as to receive the under sides of the supports 98-100. As noted, the slope of these supports determines the fall of the finished trough.

With the form thus supported and the end wall member 24 in place, together with the assembly to the form of the end wall means 26, pouring of the concrete may begin. The end wall 24, being of one-piece construction is held in place by any suitable means, such as being wired to the form or by rods at the end like those at 112. The result after pouring is seen in FIG. 6 where the trough is completely formed of concrete except for the channel 56 and drain outlet 88. As already noted, the elbow supporting wire 90 is clipped and the form raised by any suitable means, after retraction of the side walls to narrow the angle of the Y. The channel 26 remains in place, also as previously described. The nails 60 are clipped as is the remaining length of the wire 90. The trough and floor 114 can be poured at once, and, after removal of the form, the floor and trough are finished.

When the form is removed, removal of the end wall means leaves the drain elbow in communication with the channel 26 and also open to whatever drain line it is connected to. In a preferred use of the trough, the opening at the top of the elbow is temporarily plugged by any suitable means (not shown) and a small quantity of water is poured into the channel, the amount depending upon the size of the trough and the number of animals using the floor. After a certain amount of waste has collected, the plug at the elbow 88 may be removed to drain the trough, after which the elbow is again plugged and the process repeated periodically according to the circumstances.

I claim:

1. A variable-angle Y-shaped mold structure for use in forming a V-shaped concrete trough in a larger, preformed V-shaped trench in the earth, comprising a pair of horizontally elongated side boards, each having upper and lower edges and opposite upright end edges, said boards being arranged with their lower edges spaced laterally apart to provide an elongated bottom opening; means hingedly connecting the boards together at their lower edges on a horizontal axis to enable the boards to move relative to each other and thus to provide a variable-angle Y; means cross-connecting the boards adjacent to their upper edges for selectively moving the boards about the hinge axis to establish a preselected angle of the Y; elongated gutter means attached to the boards at their lower edges to close the aforesaid bottom opening; and a pair of V-shaped end wall members received respectively at the opposite end edges of the boards.

2. The structure of claim 1, characterized in that the gutter means is detachable from the boards to remain in the trough when the mold structure is removed.

3. The structure of claim 1, further characterized in that the gutter means is provided with a drain outlet.

4. The structure of claim 1, further characterized in that an elongated, support strip is attached to each side board adjacent to its upper edge.

5. The structure of claim 4, further characterized in that each support strip is attached to its side board at an angle to the horizontal to enable support of the structure in a sloping position in the trench.

6. The structure of claim 1, further characterized in that the hinge means includes a pair of generally upright elements within the V and having the hinge axis at their lower ends, said elements rising from said axis to a level generally that of the side board upper edges, each of said elements being cross-braced to its associated side board, and the means for selecting the angle between the side boards is connected between the upper end portions of said elements.

7. The structure of claim 6, further characterized in that there are a plurality of similar elements spaced apart lengthwise of the structure and there are a plurality of means for selecting the angle between the side boards.

8. The structure of claim 1, further characterized in that at least one end wall member is made up of a pair of laterally coplanar members, each attached to a side board for movement therewith as the angle of the Y is varied.

9. The structure of claim 8, further characterized in that the aforesaid end wall members have confronting edges spaced apart to leave a Y-shaped opening between them, a removable cover means is attachable to said end wall members to close said opening.

10. The structure of claim 1, further characterized in that at least one end wall member has a bottom portion including a depending circular projection for attachment thereto of a drain conduit.

11. The structure of claim 10, further characterized in that the aforesaid end wall member includes an upright lifting attachment for lifting said end wall member from the finished trough.

* * * * *